United States Patent [19]

Wright

[11] Patent Number: 4,744,278

[45] Date of Patent: May 17, 1988

[54] ROTARY MACHINING TOOL AND METHOD OF ITS MANUFACTURE

[75] Inventor: James L. Wright, Creswell, Oreg.

[73] Assignee: Weyerhaeuser Company, Tacoma, Wash.

[21] Appl. No.: 918,582

[22] Filed: Oct. 9, 1986

Related U.S. Application Data

[63] Continuation-in-part of Ser. No. 859,676, May 6, 1986, abandoned, which is a continuation-in-part of Ser. No. 823,152, Jan. 27, 1986, abandoned, which is a continuation-in-part of Ser. No. 725,958, Apr. 22, 1985, abandoned.

[51] Int. Cl.[4] .................. B27B 33/08; B27G 13/12; B23C 5/22
[52] U.S. Cl. ........................ 83/839; 83/841; 83/845; 76/112; 144/218; 144/241; 407/51
[58] Field of Search .............. 83/835, 839, 840, 841, 83/844, 845, 830, 831; 76/112; 407/33, 44, 47, 51; 144/218, 230, 241

[56] References Cited

U.S. PATENT DOCUMENTS

| | | |
|---|---|---|
| 14,172 | 1/1856 | Tyler . |
| 207,003 | 8/1878 | Berry . |
| 540,065 | 5/1895 | Krieger ................. 83/841 |
| 579,383 | 3/1897 | Coyle . |
| 912,774 | 2/1909 | Aupperle et al. . |
| 2,422,111 | 6/1947 | Lundberg . |
| 2,736,352 | 2/1956 | Wright ................ 83/844 X |
| 2,746,494 | 5/1956 | Cox . |
| 2,978,000 | 4/1961 | Raney . |
| 2,994,350 | 8/1961 | Lundberg ............... 83/845 |
| 3,633,637 | 1/1972 | Kolesh et al. . |
| 4,257,302 | 3/1981 | Heimbrand ............... 83/839 |

FOREIGN PATENT DOCUMENTS 684747 4/1964 Canada .
1102721 10/1955 France .
1251829 12/1960 France .

Primary Examiner—Donald R. Schran

[57] ABSTRACT

The present invention is a rotary machining tool and a method of making it using an easily replaceable cutter element assembly. A circular saw is exemplary of a cutting tool which can be made using the present invention. The cutter element assembly comprises two portions. The first is an inverted, generally U-shaped clevis with spaced apart side portions that fit over the circumferential edge of a sawplate. The clevis has an upper portion which extends outwardly from the sawplate edge thereby defining a tooth retaining socket between the sawplate edge and the clevis. The side portions of the clevis are apertured to accept a pin for attachment to the sawplate which has a corresponding aperture. A buttress attached to the clevis normally bears against the leading edge of a gullet and prevents rearward rotation when in use. The second member is an insertable tooth having a head and an elongated tapered shank. The shank has a taper on its upper surface sufficient to form a self-releasing taper, usually between 3° and 10°. The sides of the shank have less taper so as to form a self-locking taper, typically between 0° and 2.5°. The tooth shank is driven into the socket formed between the clevis and the sawplate. As the tooth is driven in, the clevis forced radially outward against the attaching pin so as to tightly lock the assemby until the tooth is again driven out for sharpening or replacement. While the teeth may be sharpened in place on the sawplate, it is frequently advantageous to disassemble the saw and sharpen the teeth separately. This permits a number of grinding configurations to be used which are not otherwise possible when the saw is fully assembled. The only tools required for saw assembly and disassembly are a hammer and punch. A 1.5 m diameter saw having 60 teeth can be completely retoothed in place in as little as 6 minutes.

54 Claims, 5 Drawing Sheets

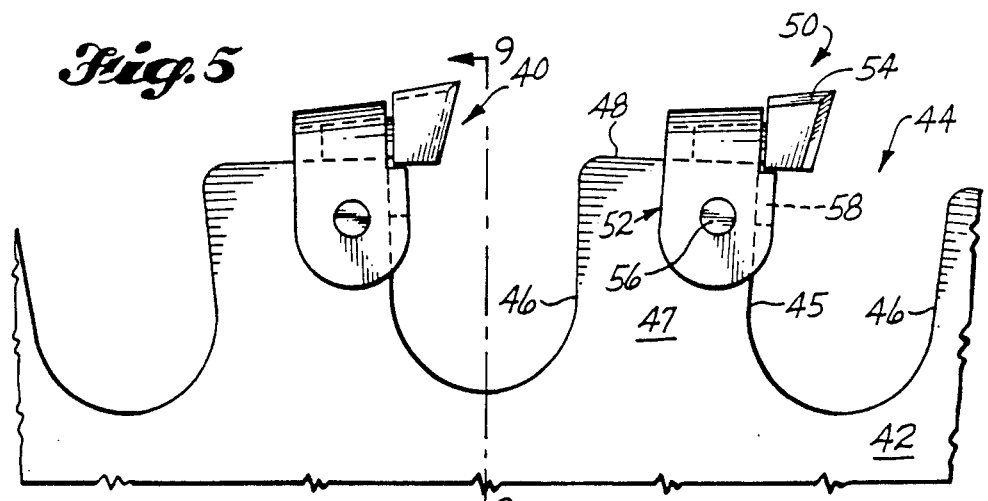
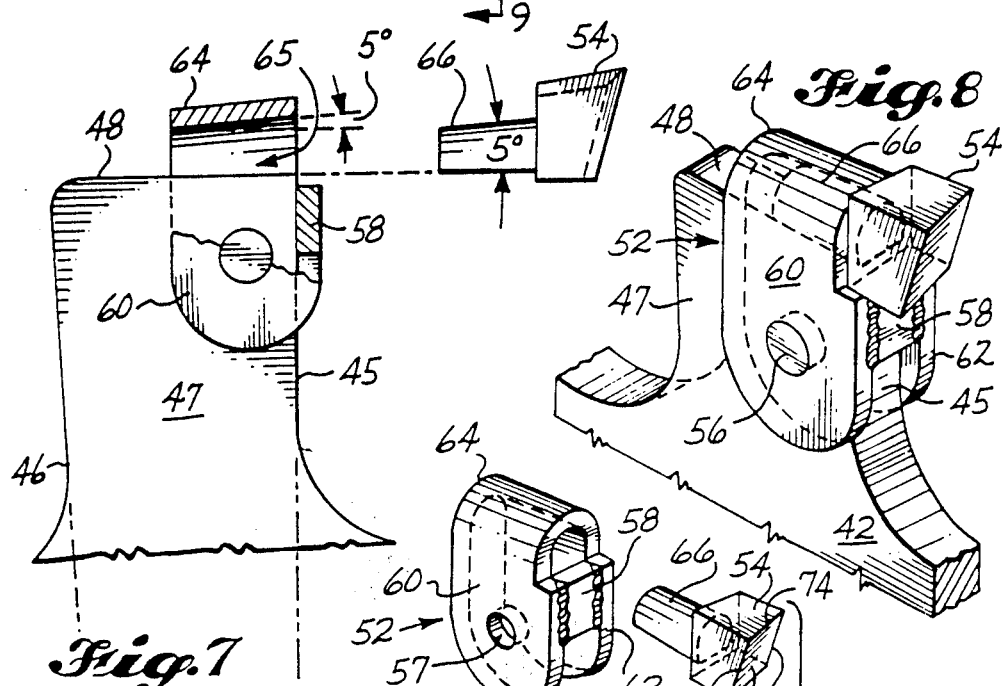
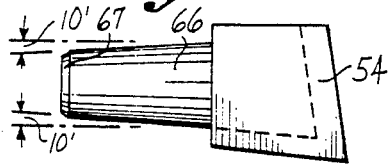
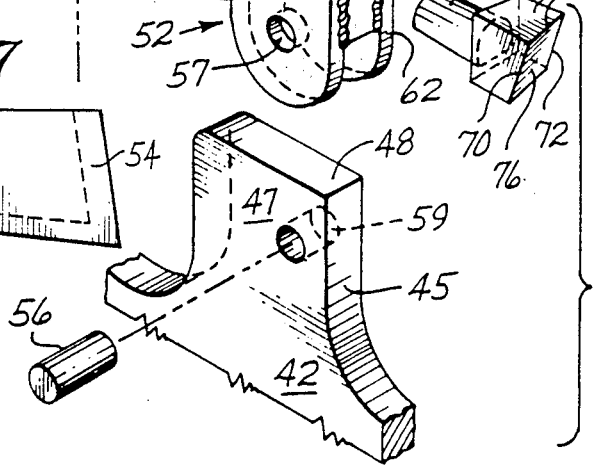

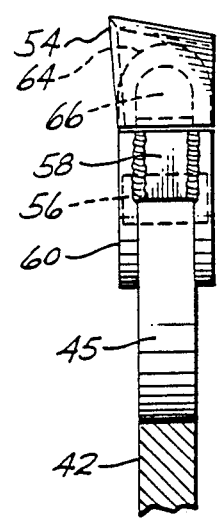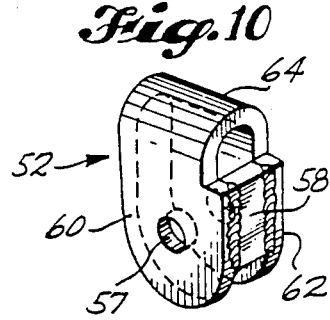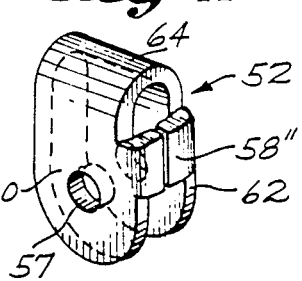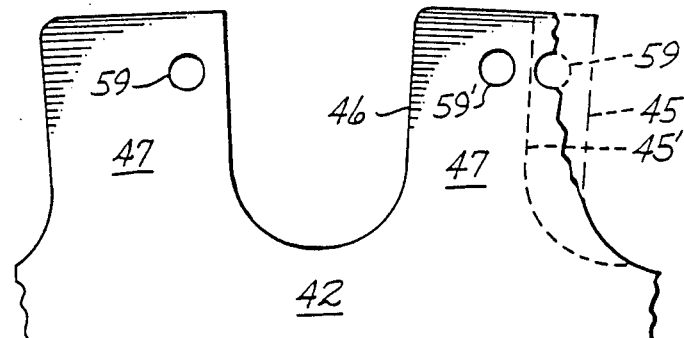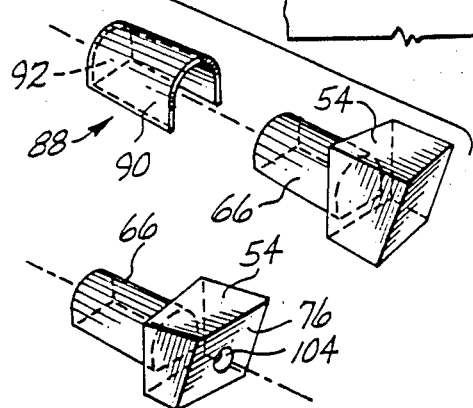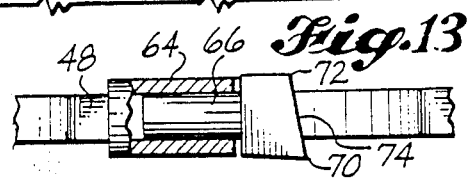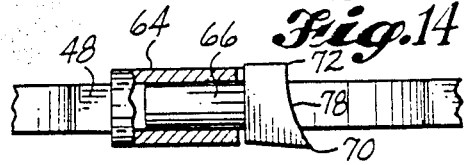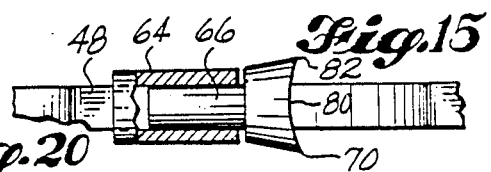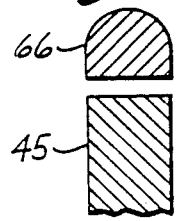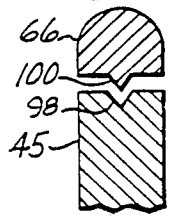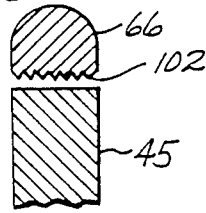

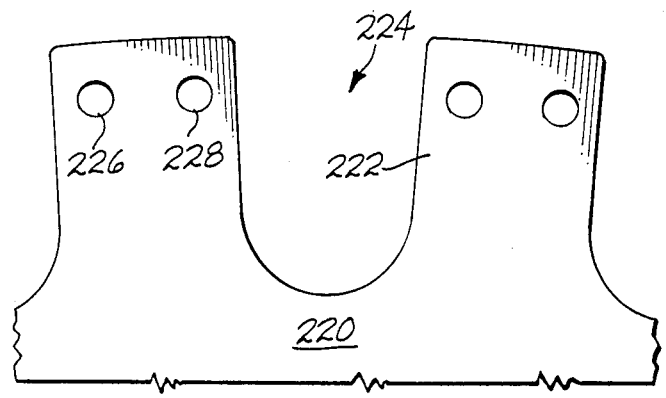
*Fig. 27*
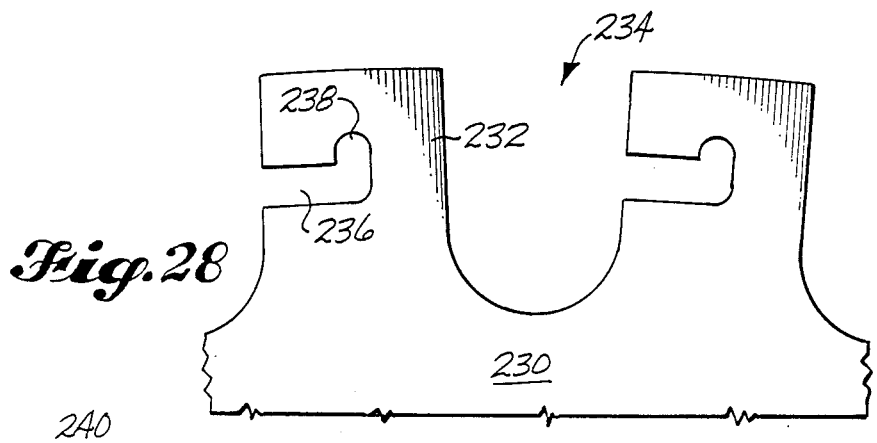
*Fig. 28*
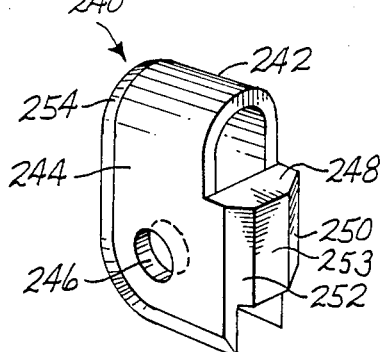
*Fig. 29*
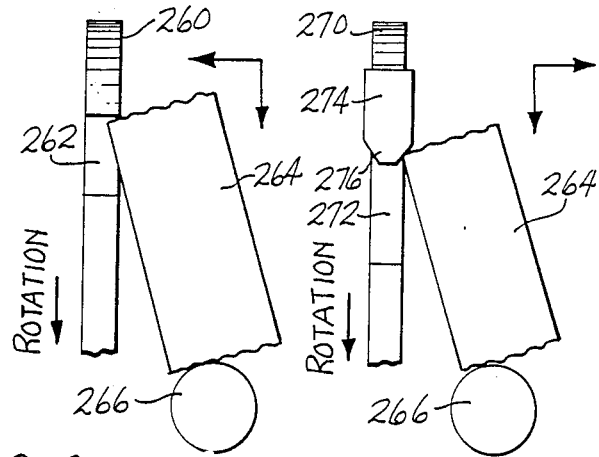
*Fig. 30*  *Fig. 31*

ROTARY MACHINING TOOL AND METHOD OF ITS MANUFACTURE

This application is a continuation-in-part, of application Ser. No. 859,676, filed May 5, 1986, which was a continuation-in-part of Ser. No. 823,152, filed Jan. 27, 1986 which was a continuation-in-part of Ser. No. 725,958, filed Apr. 22, 1985, all abandoned.

BACKGROUND OF THE INVENTION

The present invention relates to an insertable cutter tooth assembly for rotary machining tools, such as circular saws, side milling metal cutters or key seat cutters. The cutter tooth may be easily and rapidly replaced if dulled or damaged.

The circular saw for cutting wood or other materials may be chosen as one example where the present invention may be used to excellent advantage. This tool is technologically a far more sophisticated device than its outward appearance would suggest. The saw normally consists of a centrally apertured round metal plate usually provided with gullets and sharp teeth spaced around the periphery. The gullets provide a volume for accumulating and clearing sawdust produced by the teeth as they pass through the material being cut. Many versions of circular saws exist since they are used in many applications for cutting materials varying widely in characteristics. A typical circular saw will have alternating teeth designed to remove material from the left and right-hand sides of the cut being made. Only a small portion of a tooth is involved in making a cut. This results in a high-stress loading and high wear factor which necessitates frequent resharpening and/or repair. To reduce this need involving downtime, hardened teeth are frequently used. It is not desirable to harden the entire blade since this normally induces an unacceptable brittleness. The body of the saw, or sawplate as it is normally called, is usually made of a tough but relatively soft metal that can withstand considerable bending and twisting from load-induced stresses. Additionally, the larger sizes are normally prestressed by hammering and peening to induce a built-in tension or "hoop stress" into the rim area of the saw.

Replaceable teeth have been in use with circular saws for over a century. These teeth have been an answer to the need for widely differing metal properties in the sawplate and at the point at which the cut is made. Inserted teeth are locked into the periphery of the sawplate by a number of differing arrangements. They are normally made of hardened steels, although cemented carbides are also occasionally employed. Alternatively, hard teeth may be brazed to appropriate locations on the perimeter of the saw, or to the tips of inserted teeth. Brazed teeth are almost universally cemented carbides since brazing temperatures normally lower the hardness of steels. It is common practice for both inserted teeth and brazed teeth to be sharpened in place on the sawplate. Alternatively, depending on the particular construction for locking the tooth in place, inserted teeth may be removed and sharpened separately. This is not normally done except when tooth replacement is necessary since the locking mechanisms tend to be relatively complex and are often riveted or semi-permanently fixed into position.

The following United States Patents can be sited as exemplary of known insertable teeth that have some relationship to the present invention. U.S. Pat. Nos. 2,736,352 (Wright), 2,746,494 (Cox), 2,978,000 (Raney), show insertable replaceable teeth for chainsaws but have some commonality with the present invention. Each of these inventors uses a tooth having a head portion attached to a rearwardly extending shank. In turn, the shank is forced by a friction fit into a socket formed on a modified cutter link plate. The Wright saw tooth assembly uses a round cup-shaped tooth in which edge orientation relative to the chain is not critical. In the Cox tooth, the rear surface of the head has protruding nibs that engage corresponding notches in the socket in order to ensure proper orientation and prevent rotation. The shank of the Raney tooth has a ridge which engages a longitudinal slot formed in the socket to serve the same function. Wright also shows versions of his structure which can be used on round or band saws. Here, the socket that holds the tooth is formed in a bent strip of sheet metal which, in turn, is permanently riveted to the sawplate. The inventor notes that this tooth holder may be bifurcated to straddle the saw blade. He further shows a tooth shank having a converging taper away from the head portion. Another inserted tooth for circular saws is shown in U.S. Pat. No. 2,994,350 (Lundberg). Here a strap is riveted to the outer perimeter of one of the buttresses or "tooth roots" so as to form a socket structure. The shank portion of an insertable tooth is then pressed into the socket where it is held by a spring mechanism. The tooth abuts against a shoulder on the buttress which helps to retain it in position when subjected to operating stresses.

The teeth of Wright and Lundberg are used on circular saws with the axis of the shank portion lying generally tangent to the circumference of the saw. Radially inserted teeth are shown in the similar U.S. Pat. Nos. 579,383 (Coyle) and 912,774 (Aupperle et al.). In both of these a locking strap is formed around the buttress between gullets. The strap is retained by one or more locking structures on the gullet. In turn, the tooth is inserted essentially radially along the leading edge of the gullet where it is held by the strap. A number of interlocking elements retain the integrity of the arrangement. However, the teeth cannot be readily removed without prying open and potentially destroying the retaining strap. U.S. Pat. No. 540,065 (Krieger) shows a replaceable tooth similar to Lundberg's but oriented radially and retained with a rivet or locking pin.

Examples which span a century of development showing more conventional, semi-permanently inserted teeth are seen in U.S. Pat. Nos. 207,003 (Berry) 2,422,111 (Lundberg) and 4,257,302 (Heimbrand). Other structures worthy of note are Tyler, U.S. Pat. No. 14,172 and Kolesh, et al., U.S. Pat. No. 3,633,637. Kolesh, et al. show inserts comprising several teeth which are tightly riveted into a T-slot machined into the circumference of a round sawplate. This group of patents is more noteable as an example of historical development than it is of close pertience to the present invention.

One problem with many of the known inserted teeth is that during use they tend to act as wedges serving to detension the outer rim of the sawplate. Further, as noted previously, many are difficult to replace and involve the removal of rivets or retainers. Further, few of the inserted tooth types which have stood the test of time are replaceable at the point of use if dull or damaged. Common practice is to remove the entire sawplate, transport it to the filing room and replace it with a similar sharp saw. Saw replacement can involve considerable loss of productive time.

SUMMARY OF THE INVENTION

The present invention comprises a rotary cutting tool and the method for its manufacture. The invention further comprises replaceable cutter element assemblies including teeth or cutter elements and a clevis for attaching them to the tool body.

The invention is conveniently described using the well known circular saw as an example. It will be fully appreciated by those skilled in the art that the invention should be considered in much broader terms since in its generic form it is useful for many types of rotary machining tools other than saws.

The combination of a tooth or functionally similar cutter element and a clevis is conveniently referred to as a tooth assembly. It comprises two portions. The first is an inverted, generally U-shaped clevis or saddle having an upper or socket defining portion and two side or arm portions. The side portions of the clevis are spaced apart so as to fit snugly over the circumferential edge of a sawplate or other generally similar circular or disk-shaped tool body. "Snug" can be generally defined as being positionable on the sawplate with very light force or by hand but without undue play or looseness.

The clevis is sized so that the upper portion will extend outwardly from the sawplate edge or periphery. The space so defined between the upper portion and sawplate becomes a tooth-retaining socket. The side portions of the clevises are apertured to accept at least one transverse pin for attachment to the sawplate. The side portion apertures and any attaching pins are sized so that the pin can generally be inserted by hand, or with simple driving tools. In the most preferred embodiment only a single pin will be used. The clevis must also have associated with it some means to prevent any tendency to rearward rotation when it is installed on the sawplate. This means maybe a second pin, but it is more preferably a reinforcing strap or buttress of some sort which will bear against the sawplate.

An insertable tooth completes the assembly. This tooth has a head portion with at least one cutting edge, normally two, and an elongated tapered shank. The lower sawplate contacting surface of the shank is normally planar in configuration while the upper surface is sufficiently rearwardly tapered with respect to the lower surface to form a self-releasing taper. This taper should be greater than 3° and will generally be within the range of 3°-20°, preferably about 3°-10°, and most preferably about 5°, as measured between the bottom surface and a longitudinal centerline lying on the upper surface. Stated in other words, the top to bottom taper is measured in side profile. The sides of the shank are tapered with regard to each other to form a self-locking taper. This will fall in the range of 0°-2.5° and is preferably in the range of 10'-30', as seen in top profile. The shank is adapted for insertion into the socket formed between the upper portion of the clevis and the sawplate. When the tooth is inserted, the clevis is forced radially outward against the attaching pin and the assembly is then tightly locked until such time as the tooth is driven out for sharpening or replacement.

The tooth assembly is readily adapted for use either on sawplates with gullets or on plates lacking gullets. Normally it will be used on a gulleted plate. In either case, the buttress for the prevention of rearward rotation of the clevis during use can be located in a number of positions. In one case, it may be a reinforcing strap formed between or across the leading edges of the side portions of the clevis. Here it can readily engage the leading edge of a gullet or it can fit into an appropriately located notch in the periphery of the sawplate. The buttress can also be formed at a corresponding location at the trailing edges of the side portions of a clevis where it is adapted to fit within a notch formed in the periphery of the sawplate. In a further variation, the buttress is formed across the trailing edge of the upper portion of the clevis where it abuts against the circumferential edge of the sawplate. Whatever the arrangement, it is critical to prevent rearward rotation of the clevis from stresses encountered during use in order to tightly retain the shank portion of the tooth.

The sawplates usable with the invention are centrally apertured to receive a saw arbor and, for most versions of the saw, have a series of gullets, which may or may not be equiangularaly spaced, located around the periphery. The gullets define upstanding shoulders located between adjacent gullets. Each shoulder is apertured normal to the face of the sawplate to receive a pin for retaining a tooth assembly. In some versions of the saw gullets are not necessary.

It is an object of the present invention to provide a simple and improved rotary machining tool having cutter elements which may be readily installed or removed with only simple hand tools being required.

It is also an object to provide a new method for construction of a rotary machining tool having easily replaced cutter elements.

It is a further object to provide a new method for construction of a circular saw which does not reduce the hoop strength of a tensioned sawplate.

It is another object to provide a circular saw in which the teeth can be simply and rapidly replaced at the point of use without demounting the saw.

It is yet another object to provide a circular saw whose teeth need not be sharpened while installed on the sawplate.

It is still a further object to provide a cutter element assembly for a rotary machining tool which can be simply and inexpensively manufactured.

It is also an object to provide a unique insertible cutting element for a rotary machining tool.

It is yet a further object to provide a simple and effective clevis for attachment of an easily replaced cutter element to a rotary machining tool.

It is also another object to provide a new sawplate for a circular saw onto which teeth can be readily installed or replaced.

It is also a further object to provide a saw whose teeth can be sharpened or replaced without affecting built-in tensioning in the sawplate.

These and many other objects will become readily apparent to those skilled in the art upon reading the following detailed description, taken in conjunction with the drawings.

BRIEF DESCRIPTION OF THE DRAWINGS

FIG. 5 is a fragmentary side elevation showing the tooth assembly of the present invention mounted on a gulleted circular saw.

FIG. 6 is an exploded perspective view of one version of the present tooth assembly.

FIG. 7 is a partially cut away side elevation showing the clevis in place on the sawplate before insertion of the tooth.

FIG. 7A is a top plan view of a tooth.

FIG. 8 is a perspective view of the completed assembly.

FIG. 9 is an end-on view of one installed tooth assembly seen along line 9—9 of FIG. 5.

FIGS. 10 and 11 show variations in strap-type buttresses to prevent clevis rotation.

FIG. 12 shows how a damaged sawplate can be repaired and reused with the present tooth assembly.

FIGS. 13–15 are edge views of three different ways in which the tooth head portion can be ground.

FIG. 16 shows a shim useful in association with a tooth in the event that a clevis becomes stretched.

FIG. 17 shows a tooth having a dimpled face for ease of mounting.

FIGS. 18–20 show cross-sectional views of different versions of the tooth shank designed to prevent sideways rotation from operating forces.

FIGS. 27 and 28 are sawplate variations suitable for the present invention.

FIG. 29 is an alternative and most preferred form of clevis.

FIGS. 30 and 31 show how the clevis of FIG. 29 can reduce or prevent throwing of cutoff end pieces.

DETAILED DESCRIPTIONS OF THE PREFERRED EMBODIMENTS

While the description of the invention to this point has been directed to circular saws for wood, the invention should be considered in broader terms as it is expected to find many applications in other rotary machining tools. Thus the term "saw" as used here is exemplary and should be construed to include such other metal and woodworking tools as milling machine cutters, planers, routers, shapers, etc.

Figure 1:
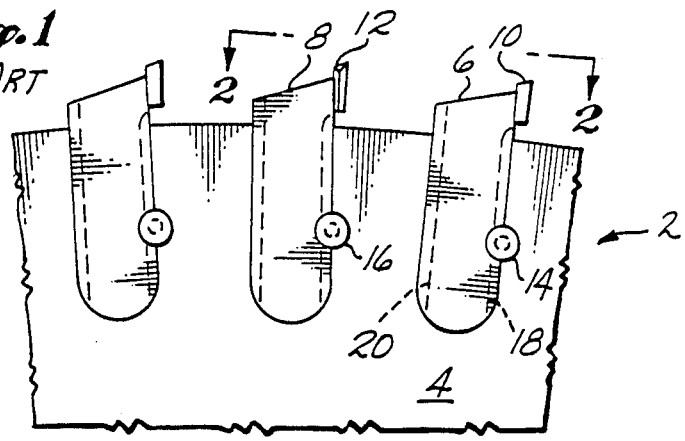
FIG. 1 is a fragmentary side elevation of a circular saw using a well known type of inserted tooth.
Figure 2:
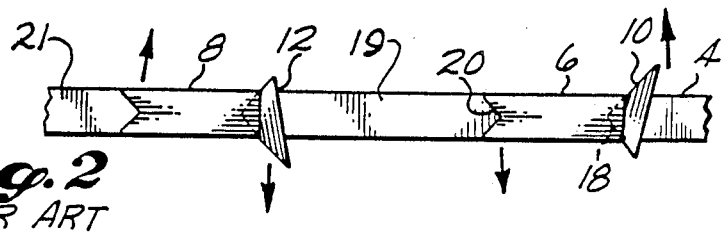
FIG. 2 is an edge view of the same saw, shown along line 2—2 of the previous figure.

An example of one type of replaceable tooth currently in use in large cut-off saws is shown in FIGS. 1 and 2. A portion of the circular saw 2 consists of a round sawplate 4 which is notched around its periphery to receive inserted teeth 6, 8. Each of the teeth will have a brazed on right or left hand cutting element 10, 12. The teeth are machined with V-shaped grooves 18, 20 along each edge. These engage corresponding ridges machined in the sides of the slots in the sawplate. Rivets 14, 16 hold the teeth in place to prevent their flying out from centrifugal force encountered during operation. The need for rivets makes this a semi-permanent type of construction and the teeth are not normally removed for sharpening. This tooth is also an excellent example of a type which acts as a wedge into the tensioned outer perimeter of the sawplate. Peening the rivets 14, 16 when the teeth are installed tends to further create compressive forces acting to neutralize the tension which has been previously built into this portion of the sawplate. During the useful lifetime of the saw, it s frequently necessary to retighten the rivets since they are loosened by forces which tend to twist the teeth during use in the directions shown by the arrows FIG. 2.

Figure 3:
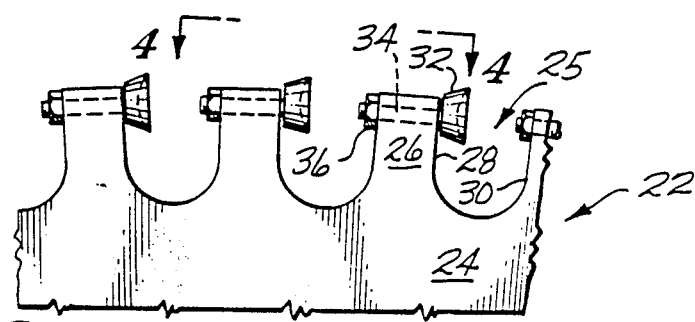
FIGS. 3 and 4 are side elevations and edge views respectively of a second type of inserted tooth.
Figure 4:
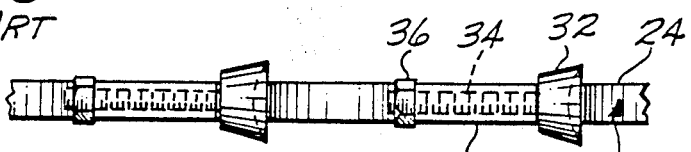

The insertible tooth construction just described is normally used on large cut-off saws, typically 1.5 to 1.8 m in diameter. A simple type of inserted tooth that has seen limited application on smaller circular saws is shown in FIGS. 3 and 4. A section of a circular saw 22 consists of a sawplate 24 into which equiangularly spaced gullets 25 have been punched around the periphery, leaving upstanding shoulders 26 between the gullets. Each of the gullets has a leading edge 28 and a trailing edge 30. Cup-shaped teeth 32 having threaded shank 34 are held in the outer end of shoulders 26 by a retaining nut 36. This construction is admirable for its simplicity and ease of maintenance and it does not adversely affect the tensioning in the sawplate. However, the holes which must be drilled in the ends of the shoulders are difficult to make with the required precision and create a weak area readily subject to breakage.

The construction shown in FIG. 5 is exemplary of the present invention. A large circular cut-off saw 40 consists of a sawplate 42 having punched gullets 44 around its periphery. The gullets possess a leading edge 45 and trailing edge 46. Shoulders 47 are defined by the peripheral portions of the sawplate lying between adjacent gullets. Each shoulder has a top surface 48 formed from the original circumferential edge of the sawplate. An aperture 59 (FIG. 6) is punched or drilled in each shoulder 47 within the angle formed by the residual portion of circumferential edge 48 and the leading edge 45 of the shoulder. These apertures are on a circle concentrically located within the peripheral or circumferential edge of the sawplate 42. A tooth assembly 50 is attached adjacent to the leading edge of each shoulder. The tooth assembly comprises a clevis, generally shown at 52, and an inserted tooth 54. This assembly is attached to the sawplate by a pin 56. Buttress strap 58, made integrally with the clevis, bears against the leading edge of the gullet to prevent any tendency to rearward rotation of the clevis due to stresses encountered during operation.

The construction and installation of the new tooth assembly on a circular saw can be better understood by reference to FIGS. 6–8. Each clevis consists of two mirror image side or arm portions 60, having leading edges 62 and an upper transverse portion 64. The inside faces of the side portions are generally planar and parallel to each other. The sides are apertured at 57 to correspond to a similar aperture 59 located near the periphery of the sawplate. These apertures are aligned to accept a pin 56 which attaches the clevis to the sawplate shoulder. The clevis should be sized so that the arms or side portions will slide easily over the sawplate by hand pressure without being unduly loose or sloppy. Similar tolerances are applied relative to the pin 56 and corresponding apertures 57, 59. The pin generally should be readily insertible by hand or by one or two light hammer taps. The attachment of the clevis to the sawplate without the need for other than simple tools is one of the key features of the present invention.

The clevises are preferably investment cast of a hard, high tensile strength steel. Types 4130 or 4140 steel heat treated to 40–45 Rockwell C hardness have proved very satisfactory. While this will vary with the particular configuration of a clevis, the buttress strap should normally have a thickness about 150-300% greater than the sidewalls. A large percentage of the dynamic load on the clevis is carried by the buttress strap. Failure of this portion would permit the clevis to rotate backwards slightly during use. This would then allow the tooth to lift and be torn free of the saw.

Preferably the pins used to attach the clevis to the sawplate are of relatively soft material. These should normally have a tensile strength that does not exceed about 1.10 MPa and Rockwell C hardness less than 38. The ends of the preferably pins should be chamfered and not extend significantly beyond the clevis. Functionally equivalent variations in the pin structure are permissible. As one example, the outside edges of side apertures 57 in the clevises may be lightly chamfered rather than, or in addition to, the ends of the pins. The pin itself may be in the form of a flush headed rivet so that it is driven into the clevis from one side only. In this case the aperture in the appropriate side of the clevis is countersunk to accept the rivet head so that it does not project a significant distance. Further, one or both ends of the pins may be lightly peened or swaged to provide an additional margin of safety against loss. If peened, the pin ends should not be displaced so much that pin removal will be difficult or that the clevis is clamped against the sawplate so that it will be unable to freely move radially against the pin when a tooth shank is inserted. There are two reasons why relatively soft pin material is desirable. In the case of extreme operating stresses against the tooth assemblies, the pins can shear and prevent serious sawplate damage which might otherwise occur. Further, the softer pins can conform to slight dimensional irregularities in the clevis and sawplate aperatures.

The pin location is placed in the clevis sides and sawsplate so that the upper portion 64 of the clevis extends beyond the sawplate perimeter 48 so as to define a socket 65 to retain the shank 66 of an inserted tooth. The teeth, as seen in FIGS. 6 and 7, have a head portion 54 and a shank portion 66. In the final stage of assembly, the tooth shank 66 is lightly driven into socket 65. The small amount of top-to-bottom rearward taper on the shank acts as a wedge which forces the clevis radially outward so that the lower edge of aperture 57 bears tightly against pin 56. This locks the assembly so securely that normally the pin will gall if an attempt is made to drive it out while a tooth is in position. It is evident that operating forces will tend to maintain the tightness of the tooth in the socket. When the teeth become dulled or damaged from use, they may be easily removed using a hammer and punch directed against the rear of the shank portion. The clevis assembly can also be removed at this time, if this is desirable for any reason, since the radial force against the pin has been relaxed. Experience has shown that the 60 teeth in a cut-off saw 1.5 m in diameter can be replaced in about six minutes without any need for removing the saw from its operating location.

While the drawings show the tooth shank 66 as being completely retained under the clevis, it is desirable in some tool configurations to use a longer shank that extends beyond the trailing edge of the clevis. Tooth removal is made easier since a punch is not normally required. More importantly, this reduces the dynamic load on the pin making failure of that element less likely. Additionally, it further strengthens the tooth assembly against forces tending to cause rearward rotation of the clevis.

Depending on the type of tool and the service in which it is being used, it may be desirable to have greater cross-sectional area of tooth shank 67 than might be inferred by reference to the accompanying figures. This can be readily achieved by increasing the top-to-bottom depth of the shank without altering the side-to-side dimensions or the taper angles. The clevis can be configured accordingly.

The head portion of each tooth will normally have sharpened lateral edges 70, 72, a transverse edge 74, and a face portion 76. In the example showing a right hand cutting tooth in FIG. 6, the cutting forces will be encountered almost entirely near the junction of lateral edge 70 and transverse edge 74. It is this corner that will be dulled during use.

It is convenient if the upper portion 64 of the clevis is formed into an arch shape to which the tooth shank 66 will conform. The upper portion of the arch should preferably have the configuration of a segment of a circle. This arch shape will prevent turning or twisting of the tooth so that proper alignment of the cutting edges is always maintained. As seen best in FIG. 7, the upper portion of the clevis is tapered rearwardly at a small angle, usually in the neighborhood of about 5°. The upper surface of the tooth shank may be formed at the same taper or at a very slightly greater angle to ensure a tight wedging action between the upper portion of the clevis and the circumferential edge of the sawplate. Preferably the sides of the tooth shank are also tapered rearwardly but at a smaller angle, preferably about 1/6°-½° (10'-30'), as seen in FIG. 7A.

A longitudinal centerline along the inside surface of the clevis upper portion will typically make an acute angle falling between about 70°-90° with the leading edges of the side portions. This angle will closely approximate the complement of the tooth shank taper angle.

It can be advantageous to relieve the inside face of the buttress strap so that it forms an angle up to 10°, preferably about 5° with the side portion edges. In the preferred case, the clevises will be usable on any gulleted saw having a positive hook angle up to 5°. The angle between the inside face of the buttress strap and the longitudinal centerline along the clevis upper portion longitudinal centerline may conveniently be 90°, although this angle may vary with specific designs.

The taper formed between the lower and upper surfaces of the tooth shank, and the corresponding taper of the upper portion of the clevis, is present primarily to induce a wedging action under the clevis. This taper is one that should be in the so-called self-releasing range, i.e., greater than 3°, preferably between about 3° and 10° and most preferaby about 5°. In order to prevent accidental loss of the teeth, the sides of the shank are formed at a lesser angle to form a self-locking taper. This will be in the range of 0°-2.5° and preferably about 10'-30' of angle. Parts joined by tapers in this range are frictionally bonded and cannot be readily separated without driving or wedging the parts. The familiar Morse tapers used for tool shanks; e.g., large drill bits, are examples of self-locking tapers.

It is not necessary for the sides of the socket portion of the clevis to be formed to an angle strictly conforming to the angle of the sides of the tooth shank. Even when the sides of the socket are parallel; i.e., with no taper, they will normally stretch sufficiently to conform to the tooth shank. However, this is not the case with the upper surface of the shank because of the larger angle involved. As explained before, the shank angle and clevis angle should essentially correspond.

The clevises themselves may be made in a number of alternative constructions to resist rearward rotation. Three of these are seen in FIGS. 9-11. In FIG. 9, the buttress strap 58 is welded between the side or arm portions 60 of the clevis. A similar construction is shown in FIG. 10. However, here the buttress portion 58' is extended the full length of the leading edges 62 of the side portions of the clevis. A construction of this type may be useful in assisting with sawdust removal and in prevention of sawdust particles from moving backward along the sides of clevis and the teeth. It is not always necessary for the buttress strap to be welded as long as it is in some way integrally formed with the clevis. FIG. 11 shows another construction in which the buttress strap 58" is formed by a pair of ears which are bent inwardly from the edge of the clevis. The clevis can be manufactured by any of a number of conventional methods; i.e., by stamping, machining, or investment casting, the last being a presently preferred method.

Occasionally after long periods of use, stress cracks may develop in the leading edges 45 of sawplate shoulders 47. These are infrequent, but when they do occur, it would be typical for them to pass through aperture 59. With the typical inserted tooth constructions used in the past, such a crack is usually not repairable and the entire sawplate must be scrapped. This is not necessary with the present construction. As seen in FIG. 12, a stress crack passing through aperture 59 has developed. In this case it is only necessary to "gum out" of grind back the gullet so that the leading edge is moved to position 45'. A new attachment aperture 59' is then punched or drilled at the appropriate location. This procedures causes such minor unbalance in the saw that it is of no practical consideration and can be ignored. Saw tensioning would normally be unaffected by a pair of this type.

As noted before, a major advantage of the new tooth assembly is that the teeth can be readily removed from the saw for sharpening. This opens many new possibilities which are not available on a typical round saw due to limitations of available grinding equipment for sharpening the teeth. Many of these limitations come about as a result of mechanical interference which must somehow be accommodated when the teeth remain on the sawplate. These limitations are not present when the teeth can be ground individually. Three examples are shown in FIGS. 13-15. In FIG. 13 the tooth shown is identical to the one in FIG. 6 which has been described earlier. In this case the face portion 74 is essentially planar. This is the normal way in which teeth have been ground in the past. However, it is now possible to hollow grind the teeth, as seen in FIG. 14, where the facial area 78 between lateral edges 70, 72 is ground to a radius. It is also entirely practical to make double cutting teeth as shown in FIG. 15, where the lateral edges 70, 82 both serve cutting functions and the facial area 80 between them has been ground to an appropriate radius. If hollow ground, the tooth face can be ground to any mechanically practical configuration and need not be limited to the surface of a cylinder, as is shown in FIGS. 14 and 15. For some applications a spherical grind, similar to that used in the teeth of FIGS. 3 and 4, might be preferable.

A major advantage of the present invention is that the intentionally built in stresses in the sawplate, normally referred to as tension, are unaffected during sharpening or retoothing. This reduces the cost of reconditioning, extends sawplate life, and greatly reduces or entirely eliminates the need for highly skilled labor for saw maintenance.

In a normal installation, the head portion 54 of a tooth should not be in contact with a clevis. If after long periods of use the clevises should stretch slightly, it might be necessary to use a shim to ensure a tight fit of the tooth shank in the socket formed between the clevis upper portion and the sawplate edge. Preferably this shim is not placed adjacent to the sawplate edge since this will radially displace the tooth outwards. This would be undesirable because the tooth tip would be raised above the cutting circle of the other teeth and subject to accelerated dulling. A shim of the type shown in FIG. 16 is preferable. Here shim 88 consists of an arched portion 90 which slips over the top of the tooth shank. This may have an integrally formed rear portion 92 which is engaged by the back of the shank so that the shim is readily carried into the socket when the tooth is inserted under the clevis.

The saw filer or artisan making or maintaining the saw using the present tooth assembly, will normally use a soft metal block against the face of the tooth to prevent damage while it is driven into the socket. The angled face of the tooth may cause some difficulty during this operation so that a light hammer blow is not directed axially along the shank. This problem can be overcome as shown in FIG. 17 by the creation of a small dimple 104 in face 76 of the tooth. This dimple is located along a projection of the longitudinal axis of the shank portion. The tooth can then be readily inserted by putting a small punch in the dimple where it is prevented from sliding across the face of the tooth when a hammer blow is applied.

The tooth assemblies useful with the present invention can be made of many materials. In a preferred form, they are investment cast from hard tool steels. Teeth of this type are almost as durable as those made from cemented carbides, but are much less expensive and can be more easily sharpened without the need for the use of diamond tools. Very satisfactory teeth have been produced from type S-7 tool steel with a 44 Rockwell C hardness.

The teeth in saws having right and left hand cutters are subject to twisting forces during a cut. Looking at the saw shown in FIG. 2 as an example, tooth 10 is subject to forces which tend to rotate it in a counterclockwise direction while tooth 12 is subject to forces tending to rotate it in a clockwise direction. These stresses are transmitted to the main tooth bodies 6, 8 which have been observed by high-speed photographs to actually twist slightly while they are cutting. This twisting causes the adjacent portions 19, 21 of the sawplate 4 located between the teeth to be deflected in opposite directions and induces a rippling or sinuous motion along the edge of the saw. In the particular saw shown in FIG. 1, it is mainly this twisting action which tends to loosen rivets 14, 16 requiring their frequent tightening. Similar stresses are encountered by saws using the present tooth assembly so that the tooth on the right hand end of FIG. 5 would be subject to counterclockwise rotational forces while the tooth at the left would be subject to clockwise forces. Experience to the present time has shown that this should not be a problem. However, additional ability to resist these forces may be important in certain applications. Constructions to resist rotational forces is shown in FIGS. 18-20. The tooth shown in FIG. 18 has been described previously. Here the sawplate contacting surface of tooth shank 66 is essentially planar. In the version of FIG. 19, sawplate 45 has a V-groove 98 machined in its periphery. This is engaged by a corresponding V-shaped ridge 100 provided on the sawplate contacting surface of the tooth shank. In another version shown in FIG. 20, the sawplate contacting surface of the tooth shank may be provided with small sharpened serrations 102. These will simply bite into the sawplate edge when the tooth is inserted to effectively resist any rotational forces. However, experience to date has shown that these additional measures to resist rotation are not normally necessary.

Experiments have been made on new and used saws of the types shown in FIGS. 1 and 5 to determine tooth deflection under given twisting loads. There was little difference in deflection before and after prolonged use for the saws of the present invention. An equivalent diameter saw of the FIG. 1 type, in new condition, had about 65% greater deflection, compared to that of the present invention. After use so that the rivets had loosened somewhat, the side deflection of the FIG. 1-type saw under a twisting load was about 380% greater.

Figure 21:
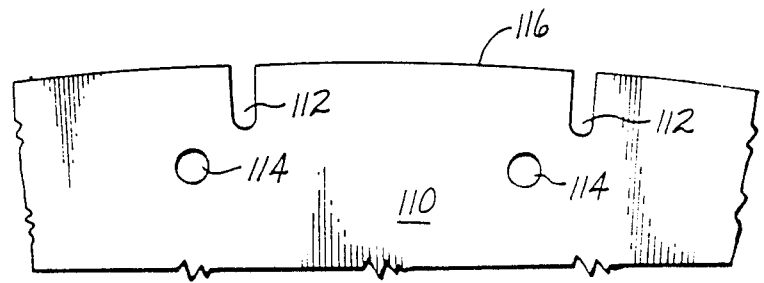
FIG. 21 is an example of an ungulleted sawplate useful with the present tooth assembly.
Figure 22:
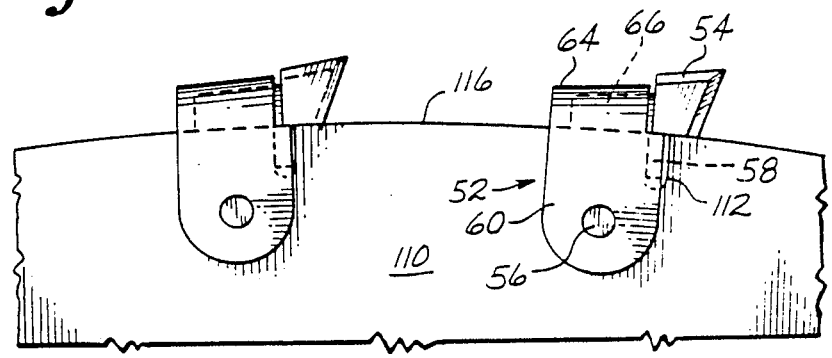
FIGS. 22–24 show three variations of the clevis having different sawplate engaging buttresses for prevention of clevis rotation.
Figure 23:
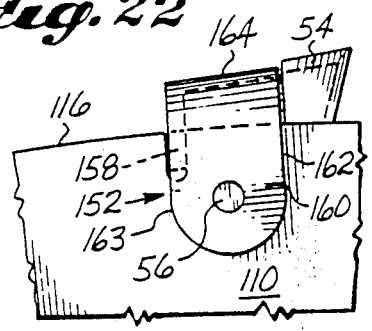

In all of the examples described to date, the new tooth assembly has been shown in use on a gulleted saw. There are many applications in which gullets are not necessary. This is particularly the case where high feed rates are not used so that there is not excessively large quantities of sawdust to be carried out. Side milling or key seat cutters for milling machines are examples of a tool where this construction is especially advantageous. FIGS. 21-24 show several versions of the new tooth assembly useful for saws lacking gullets. In FIGS. 21 and 22, a sawplate 110 is punched with edge notches 112 and appropriately located apertures 114 to correspond to the apertures in the sides of the clevises. The tooth assemblies described to date are eminently satisfactory for use on a saw of this type. The buttress strap 58, attached to the leading edges of the clevises securely engages notch 112 to effectively lock the clevis assembly against rearward rotation. The construction shown in FIG. 23 is equally effective. Here the clevis, generally shown at 152, has side or arm portions 160 with leading edges 162, trailing edges 163, and an upper portion 164. The buttress strap, 58, is formed integrally with the trailing edges so as to engage notches, 112, formed in the peripheral edge of the sawplate.

Figure 24:
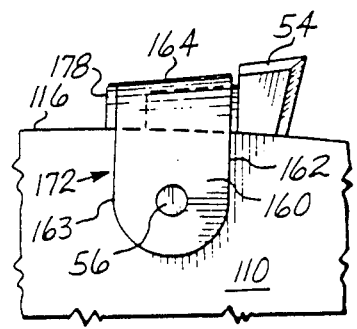

A further variation is illustrated in FIG. 24. Here the clevis generally shown at 172 has arm portions 160 with leading edges 162, trailing edges 163, and upper portion 164 similar to the version just described. However the buttress strap 178 is not located on the arm portions, but across the rear or trailing end of the upper portion where it can bear against sawplate edge 116 to prevent rearward rotation of the clevis assembly.

While a single pin in the presently preferred mode of attachment of the tooth assembly to the sawplate, multiple pins may also be advantageous under some circumstances. A second pin can serve the function of buttressing against rearward rotation.

In all of the examples shown to this point, the sawplate or tool body retained portions of the original peripheral surface to form the lower surface of the tooth retaining socket under the clevis. The top portion of the associated clevis was tapered rearwardly to accommodate the taper in the tooth shank. It is within the scope of the invention to reverse or modify this arrangement.

Figure 25:
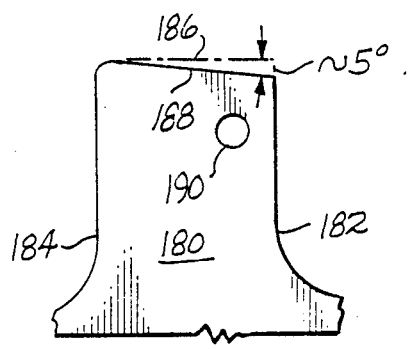
FIGS. 25–26 show an alternate version of the invention in which the periphery of the sawplate is modified.
Figure 26:
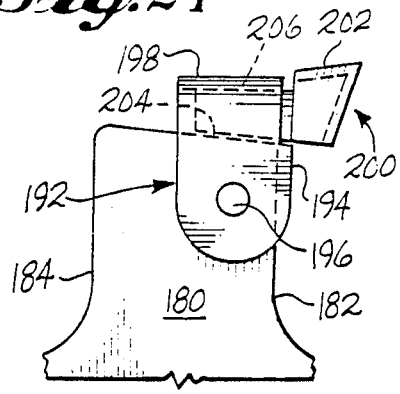

For large diameter saws the original peripheral surface of the sawplate lying under the tooth shank approximates a plane. This will not be the case for tools of smaller diameter. Here it may be desirable to machine a series of flat surfaces on the periphery so that the tool body assumes the general form of a polygon. These surfaces may even be given a negative angle as in the examples shown in FIGS. 25 and 26. Here a shoulder 180 on a saw or similar tool has a leading edge 182, a trailing edge 184, and an original circumferential edge 186. The edge 186 has been machined away to form a forward sloping surface 188 having an angle of about 5° with a tangent to the original edge. Aperture 190 is placed in the shoulder to receive the retaining pin 196 for clevis 192. The projection of leading edge 194 of the clevis here makes an angle of 90° with the longitudinal centerline of the inside surface of the top portion 198. The shank of tooth 200 has an upper surface 206 essentially normal to the head 202 and a lower surface 204 tapered upward at an angle of about 5°, as seen here in side profile.

FIGS. 27 and 28 show further alternative constructions of sawplates. Normally a saw is configured so that it can only be run in one direction. The arrangement of FIG. 27 allows the saw to be set up to run in either direction. Here the gullets 224 on sawplate 220 are formed to create shoulders 222. The shoulders are punched or drilled to provide clevis mounting holes 226, 228 which are radially equidistant from the center of the sawplate. Gullets 224 need not be symmetrical about a radius of the sawplate. An asymmetrical gullet would enable the saw to be set up with different hook angles on the gullet leading edges, if desired. This arrangement is also useful if damaged has occurred to the leading edge of a gullet.

FIG. 28 shows the use of an angled slot for mounting the clevis. Gullets 234 are formed in sawplate 230 to create shoulders 232. Slots 236 are formed in the trailing edge of the shoulders. These are angled upward to form pin retaining apertures 238. This configuration would permit the pin to be formed integrally with the clevis.

A preferred clevis configuration is shown in FIG. 29. Clevis 240 has an arch shaped upper or socket portion 242 which bridges the upper edges of the mirror image configured arm or side members 244. Aperture 246 is located in the side members so that the clevis can be pinned to a sawplate with the upper socket defining portion extending sufficiently beyond the sawplate periphery to form a tooth shank retaining socket. A reinforcing buttress strap 248 bridges the leading edges of the side portions. In some instances it is desirable to extend strap 248 all the way to the bottom of the leading edges of the side portions. A buttress strap made in this fashion has less tendency to roll forward and cause binding when teeth are removed for sharpening or replacement.

The socket defining portion 242 of the leading edges must remain unbridged to permit entry of the tooth shank. It is most desirable that the strap 248 be chamfered along the portions adjoining the side leading edges to create angled edges 250, 252 and an outside face 253. Face 253 should not be wider than the spacing between the arm portions 244 and may be narrower. It would be considered a fully equivalent structure to the outside face if chamfers 250, 252 were to intersect along a medial centerline. The reasons for the desirability of this chamfer will be explained in conjunction with the descriptions of FIGS. 30 and 31. It is also desirable that the lower end of the side portions be similarly chamfered. This chamfer may be continued around the trailing edges of the sides and across the socket defining portion, as shown at 254. A suitable chamfer angle is 30° with reference to the sides, but this is not critical.

The reinforcing strap chamfer is conveniently formed beginning along the projected leading edge of the side portions. The chamfer for the lower ends and trailing edges of the side portions will normally extend across the full thickness of the side walls. The term chamfer is not used here to indicate a mere easing of a sharp edge. The chamfered areas will have a face that is greater in width than the thickness of the wall portion associated with it. Generally the width of the chamfer face will be about 1.4 to 2 times the thickness of the associated wall portion.

FIGS. 30 and 31 show why the chamfered edges are important. The present invention is frequently used for large diameter saws. Many of these are trim or cutoff saws that may be 1.5–1.8 m in diameter, or even larger. In this service they may often be used for squaring-up log ends. This frequently involves taking off rather thin slices, often only 5–10 cm long. A cutoff saw is normally installed to swing through a cut and then withdraw through the same cut. Occasionally a cut off end, or lily pad as it is often called, will fall against the withdrawing sawblade. If the edge of the end piece slips into the saw so that it drops into a gullet it can be thrown with great force. This situation obviously presents a serious safety hazard for nearby workers. FIG. 30 illustrates this situation where a trimmed end piece 264 has fallen into gullet 262 of a conventional sawblade 260. The piece may be pinched against a roller 266 that can act as a fulcrum to throw the piece into a violent tumble. Serious sawplate damage is a further adverse effect that frequently occurs when a cut off end is pinched in this fashion. With a saw 270 made according to the present invention (FIG. 31), using a clevis 274 with at least a chamfered leading strap edge 276, a piece 264 falling into gullet 276 is directed away from the spinning saw. At the worst this end piece may be flopped over on its side but it is not thrown violently and the saw is protected against damage.

Having thus described the best modes known to the inventor of making and using the present saw tooth assemblies, it will be apparent to those skilled in the art that many variations can be made without departing from the spirit of the present invention. It is the invention of the inventor that the invention be limited only as described in the following claims.

What is claimed is:

1. A rotary machining tool having a plurality of replaceable spaced apart peripheral cutter element assemblies which comprises:
    a. a generally disk-shaped tool body having a plurality of pin receiving apertures placed therethrough at spaced apart locations around a circle concentrically located adjacent to and within the peripheral edge of the tool body;
    b. a cutter element assembly pinned to the tool body at each aperture, each cutter element assembly further comprising an insertible cutter element means and a clevis means for holding the cutter element means in place on the tool body,
    each clevis means generally being of inverted U-shape in transverse cross section and having an upper portion extending beyond the tool body periphery, two side portions spaced apart to fit snugly over the circumferential edge of the tool body and an associated rotation prevention buttress means acting against the tool body to prevent rearward rotation of the cutter element assembly while subject to use stresses,
    the side portions of the clevis means being apertured along a common axis to accept a transverse pin means for attachment to the tool body,
    said clevis means upper portion serving in conjunction with the circumferential edge of the tool body to define a tapered cutter element means retaining socket oriented generally tangent to said edge, and
    the cutter element means comprising a head portion having at least one cutting edge, and an elongated tapered shank portion having a lower tool body periphery contacting surface and side and upper clevis means contacting surfaces, said tapered shank portion of the cutter element means being inserted into the cutter element means retaining socket and tightly wedged between the upper portion of the clevis means and the circumferential edge of the tool body whereby said clevis means is forced radially outward against the pin means and the assembly is securely locked in place on the tool.

2. The rotary machining tool of claim 1 in which the tool body has a series of circumferential gullets defining upstanding shoulders having leading and trailing edges, the clevis means of the cutter element assemblies are mounted straddling the peripheral edges of said shoulders, and the rotation prevention means of the clevis means is a strap across the leading edges of the side portions of the clevis means, said straps bearing against the leading edges of the shoulders.

3. The rotary machining tool of claim 2 in which the buttress means straps are essentially the full length of the leading edges of the side portions of the clevis means.

4. The rotary machining tool of claim 1 in which the tool body has peripheral edge notches and the rotation prevention means of the clevis means is a strap across either the leading or trailing edges of the side portions of the clevis means to engage said tool body notches.

5. The rotary machining tool of claim 4 in which the tool body is not gulleted and the volumes between the cutter element means serve as gullets.

6. The rotary machining tool of claim 1 in which the rotation prevention means of the clevis means is a strap rigidly affixed across the trailing end of the upper portion, said strap bearing against the circumferential edge of the tool body.

7. The rotary machining tool of claim 1 in which the upper portion of the clevis means is sloped from front to back to define a tapered cutter element retaining socket between said upper portion and the tool body circumferential edge.

8. The rotary machining tool of claim 7 in which the upper portion of the clevis is arch-shaped in transverse cross section so as to form an arch-shaped socket.

9. The rotary machining tool of claim 8 in which the shank portion of the cutter element means is of conforming cross section to the retaining socket.

10. The rotary machining tool of claim 7 in which the taper angle between the tool body contacting surface and the upper clevis contacting surface of the cutter element shank is essentially equal to or slightly greater than the taper angle of the socket.

11. The rotary machining tool of claim 7 in which the clevis means contacting side surfaces of the cutter element shank have a self-locking taper in the range of about 0°–2.5° of angle as seen in top profile.

12. The rotary machining tool of claim 7 in which the cutter element shank has a self-releasing taper in the range of about 3°–20° of angle as seen in side profile.

13. The rotary machining tool of claim 1 in which the head portion of the insertible cutter element means has a face that is essentially planar in configuration.

14. The rotary machining tool of claim 1 in which the head portion of the insertible cutter element means has a face that is hollow ground with only one of the lateral edges serving a cutting function.

15. The rotary machining tool of claim 1 in which the head portion of the insertible cutter element means has a face that is hollow ground with both lateral edges serving cutting functions.

16. The rotary machining tool of claim 1 in which the face of the head portion of the cutter element assembly has a recessed dimple located essentially on the projected longitudinal axis of the shank portion, said dimple serving as a bearing area to assist in driving the cutter element into the tapered tooth retaining socket.

17. The rotary machining tool of claim 1 in which the cutter element further has locking means associated with the shank portion for resisting sideways rotation when subject to operating forces.

18. The rotary machining tool of claim 17 in which the locking means comprises a generally V-shaped longitudinal ridge on the tool body contacting surface of the shank portion of the cutter element means, said ridge engaging a corresponding groove formed in the periperal edge of the tool body.

19. The rotary machining tool of claim 17 in which the locking means comprises a series of longitudinal serrations on the tool body contacting surface of the shank portion of the cutter element means, said serrations cutting into the peripheral edge of the tool body when the cutter element means is inserted.

20. The rotary machining tool of claim 1 in which the tool is a saw.

21. The rotary machining tool of claim 1 in which the tool is a cutter for a milling machine.

22. A method of manufacturing a rotary machining tool which comprises:
   a. placing pin receiving apertures in a generally disk-shaped tool body at a plurality of spaced apart locations around a circle concentrically located adjacent to and lying within the peripheral edge of the tool body;
   b. forming a plurality of cutter element retaining sockets around the tool body peripheral edge by pinning an inverted generally U-shaped clevis means to the periphery of the tool body at each aperture, each clevis means having a basal portion extending outwardly from the tool body periphery to define a generally tangential tapered cutter element retaining socket between the clevis upper portion and the tool body peripheral edge;
   c. buttressing the clevis means against the tool body to ensure against rearward rotation of the clevis means when the tool is subjected to operating stresses;
   d. providing replaceable cutter element means having head and elongated tapered shank portions; and
   e. wedging the tapered shank portion of a cutter element means into each cutter element retaining socket thereby forcing the clevis means radially outward against the attaching pin to tightly lock the assembly until the cutter element means is driven out for sharpening or replacement.

23. The method of claim 22 which includes placing gullets at angularly spaced locations around the periphery of the tool body to form upstanding shoulders, and further forming the pin receiving apertures through the tool body within the angle defined by the leading edge of each shoulder and the circumferential edge of the tool body so that the clevis means and cutter element means are positioned at the leading edge of each shoulder.

24. The method of claim 23 which further includes locating the buttress means along the leading edges of the clevis means so that they bear against the leading edge of each gullet.

25. The method of claim 22 which includes forming notches at angularly spaced locations around the periphery of the tool body and locating the buttress means on the clevis means so as to engage the peripheral notches.

26. The method of claim 22 which includes locating the buttress means at the trailing edge of the upper portion of the clevis means so that the buttress means bears against the peripheral edge of the tool body.

27. The method of claim 22 in which the rotary machining tool is saw.

28. The method of claim 22 in which the rotary machining tool is a cutter for a milling machine.

29. An insertible cutter element for a rotary machining tool which comprises:
   a head portion having at least one cutting edge; and
   a shank portion extending rearwardly from the head portion for insertion into a retaining means on a rotary machining tool, said shank portion having lower, side and upper surfaces,
   said lower surface being essentially planar in configuration,
   said upper surface being sufficiently rearwardly tapered with respect to the lower surface, when seen in side profile, to form a self-releasing taper, and
   said side surfaces being rearwardly tapered in reference to each other, as seen in top profile, to form a self-locking taper.

30. The insertible cutter element of claim 29 in which the self-releasing taper is in the range of about 3°–20° of angle.

31. The insertible cutter element of claim 30 in which the self-releasing taper is about 5°.

32. The insertible cutter element of claim 29 in which the self-locking taper is within the range of about 0°–2.5° of angle.

33. The insertible cutter element of claim 32 in which the self-locking taper is within the range of about 10′–30′ of angle.

34. The insertible cutter element of claim 29 in which the shank cross section is generally arch-shaped with the upper surface having the configuration of a segment of a circle.

35. The insertible cutter element of claim 34 in which the end of the shank opposite the head portion is chamfered to prevent broaching the retaining means during insertion.

36. The insertible cutter element of claim 29 in which the head portion of the insertible cutter element means has a face that is essentially planar in configuration.

37. The insertible cutter element of claim 29 in which the head portion of the insertible cutter element means has a face that is hollow ground with only one of the lateral edges serving a cutting function.

38. The insertible cutter element of claim 29 in which the head portion of the insertible cutter element means has a face that is hollow ground with both lateral edges serving cutting functions.

39. The insertible cutter element of claim 29 in which the face of the head portion of the cutter element assembly has a recessed dimple located essentially on the projected longitudinal axis of the shank portion, said dimple serving as a bearing area to assist in driving the cutter element into a retaining means.

40. The insertible cutter element of claim 29 in which the cutter element further has locking means associated with the shank portion for resisting sideways rotation when subject to operating forces.

41. The insertible cutter element of claim 40 in which the locking means comprises a generally V-shaped longitudinal ridge on the lower surface of the shank portion of the cutter element means.

42. The insertible cutter element of claim 40 in which the locking means comprises a series of longitudinal serrations on the lower surface of the shank portion of the cutter element means.

43. A clevis for attaching a removable cutter element to a generally circular tool body, said cutter element being of the type having a head with at least one cutting edge and a shank extending rearwardly from the head and said tool body having spaced peripheral notches or gullets and marginally adjacent apertures for attachment of the clevis, which comprises:
 a. two mirror image side portions spaced apart for snugly straddling the circumferential edge of the tool body, said side portions having upper and lower ends and leading and trailing edges, both side portions being transversely apertured along a common axis for receiving a pin for attachment to the tool body;
 b. a transverse upper member bridging the upper ends of the side portions to form a structure of inverted, generally U-shaped transverse cross section, said upper member having an inside surface with a longitudinal centerline forming an angle with the projected leading edges of the side portions falling between about 70°-90°, said upper member and the upper part of the side portions forming three sides of a socket defining upper portion of the clevis for retaining the shank of the cutter element; and
 c. a reinforcing buttress strap bridging in part the leading edges of the side portions, the upper ends of the side portions remaining unbridged to form the entrance of the cutter element retaining socket, the edges of the buttress strap adjoining the side portions being chamfered so as to create an outside face portion on the buttress strap that does not exceed in width the spacing between the side portions,
 the apertures in the side portions being located so that the socket defining upper portion of the clevis will extend beyond the periphery of the tool body when the clevis is installed and the circumferential edge of the tool body will form a fourth side of the retaining socket for receiving the shank of a cutter element, and said buttress strap will bear against the gullet or notch in the periphery of the tool body to resist rearward rotation during use of the tool.

44. The clevis of claim 43 in which the reinforcing strap chamfer is formed beginning along the leading edges of the side portions.

45. The clevis of claim 43 in which the lower ends of the side portions are chamfered.

46. The clevis of claim 44 in which the leading edge chamfer extends for about the full thickness of the side walls.

47. The clevis of claim 45 in which both the leading edge and lower end chamfers extend for about the full thickness of the side walls.

48. The clevis of claim 43 in which the chamfers are formed at about a 30° angle with respect to the outside surfaces of the side portions.

49. The clevis of claim 43 in which the reinforcing buttress strap averages about 150%-300% of the side wall thickness.

50. The clevis of claim 43 in which the reinforcing buttress strap has an inside face lying in a plane formed at an angle of up to 10° with the leading edges of the side walls.

51. The clevis of claim 52 in which the inside face angle is about 5°.

52. The clevis of claim 43 in which the buttress means straps are essentially the full length of the leading edges of the side portions of the clevis means.

53. The clevis of claim 43 in which the upper portion of the clevis means is sloped from front to back.

54. The clevis of claim 43 in which the upper member of the clevis has an inside surface configured so that in conjunction with the adjacent portions of the side members the socket defining portion is arch-shaped in transverse cross section.

* * * * *

UNITED STATES PATENT AND TRADEMARK OFFICE
CERTIFICATE OF CORRECTION

PATENT NO. : 4,744,278

DATED : May 17, 1988

INVENTOR(S) : James L. Wright

It is certified that error appears in the above-identified patent and that said Letters Patent is hereby corrected as shown below:

In the Abstract, line 24, "clevis forced" should read -- clevis is forced --;

in column 7, line 11, "preferably pins should" should read --pins should preferably --;

in column 9, line 32, "of grind" should read -- or grind --;

in column 9, line 38, "pair" should read -- repair --;

in column 18, line 39, "claim 52" should read -- claim 50 --;

Signed and Sealed this

Fourth Day of October, 1988

Attest:

DONALD J. QUIGG

*Attesting Officer*  *Commissioner of Patents and Trademarks*